United States Patent
Barrass et al.

(10) Patent No.: US 7,106,688 B2
(45) Date of Patent: Sep. 12, 2006

(54) SYSTEM AND METHOD FOR PREVENTING PHANTOM DATA COMMUNICATION LINKS

(75) Inventors: Hugh Barrass, Milpitas, CA (US); Brian A. Arnold, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 10/412,889

(22) Filed: Apr. 14, 2003

(65) Prior Publication Data

US 2004/0213216 A1 Oct. 28, 2004

(51) Int. Cl.
*H04J 15/00* (2006.01)
*H04J 1/12* (2006.01)
*H04L 12/63* (2006.01)
*H04L 12/66* (2006.01)

(52) U.S. Cl. .............. 370/200; 370/201; 370/461; 375/227

(58) Field of Classification Search ........... 370/200, 370/201, 461–468, 442, 445, 449; 379/4, 379/22.01, 22; 455/7; 375/222, 227, 231, 375/371
See application file for complete search history.

(56) References Cited

U.S. PATENT DOCUMENTS

| | | | | |
|---|---|---|---|---|
| 5,875,205 A * | 2/1999 | Spaeth et al. | ................. | 372/50 |
| 5,887,032 A * | 3/1999 | Cioffi | ..................... | 375/257 |
| 5,982,741 A * | 11/1999 | Ethier | ..................... | 370/201 |
| 6,219,378 B1 * | 4/2001 | Wu | ............................ | 375/231 |
| 6,339,613 B1 * | 1/2002 | Terry | ............................ | 375/227 |
| 6,473,438 B1 * | 10/2002 | Cioffi et al. | ................. | 370/468 |
| 6,633,545 B1 * | 10/2003 | Milbrandt | ................... | 370/252 |
| 6,687,288 B1 * | 2/2004 | Shteiman | ..................... | 375/222 |
| 6,724,849 B1 * | 4/2004 | Long et al. | ................. | 375/371 |
| 6,782,741 B1 * | 8/2004 | Imbert | ....................... | 73/146.5 |

OTHER PUBLICATIONS

Cioffi, "Very high-speed Digital Subscriber Lines (VDSL)," Information Systems Laboratory, 5 pages.
Cook et al., "The Noise and Crosstalk Environment for ADSL and VDSL Systems," IEEE Communications Magazine, vol. 37, No. 5, cover page plus pp. 2 and 73-78.
Cheong et al. Soft Cancellation via Iterative Decoding to Mitigate the effect of Home-LANs on VDSL (333R1), Department of Electrical Engineering, Stanford University, pp. 1-16.
T1E1.4 Working Group on Digital Subscriber Line Access, "TI. 417-2001—Spectrum Management for Loop Transmission Systems," American National Standard, 182 pages.
Zeng et al., "Crosstalk Identification in xDSL System," IEEE Journal on Selected Areas in Communications, vol. 19, No. 8, pp. 1488-1496.

* cited by examiner

*Primary Examiner*—Chi Pham
*Assistant Examiner*—Melanie Jagannathan
(74) *Attorney, Agent, or Firm*—Baker Botts L.L.P.

(57) ABSTRACT

A data communication system is provided that comprises a head-end switching system which comprises a plurality of communication ports. A port controller causes the ports to sequentially issue inquiry signals to network termination points. This sequential processing of inquiry signals prevents the formation of phantom links that may occur if physical conductors which are susceptible to crosstalk interference with connected conductors erroneously convey a response signal back to an unattached port within the head-in switching system.

23 Claims, 2 Drawing Sheets

SYSTEM AND METHOD FOR PREVENTING PHANTOM DATA COMMUNICATION LINKS

TECHNICAL FIELD OF THE INVENTION

This invention relates in general to the field of data communications and, more particularly, to a system and method for preventing phantom data communication links.

BACKGROUND OF THE INVENTION

The rapid growth of the internet and the content available through the internet has increased the demand for highbandwidth connectivity. Digital subscriber line technology meets this demand by providing higher bandwidth data service over existing twisted pair telephone lines. DSL technology achieves the higher data transmission rates by taking advantages of unused frequencies, which are significantly higher than voice band frequencies, on the existing twisted pair lines. The newer generations of DSL systems such as Very High Bit Rate DSL (VDSL) lines utilize very high frequency transmission on the order of 1 to 12 MHz in frequency.

DSL systems typically include multiple bundles of twisted pair wires that may be located within close proximity to each other. Because of the high frequencies involved, communication occurring on one wire may degrade or substantially disrupt communication on an adjacent wire by causing electromagnetically induced crosstalk on the adjacent wire. These crosstalk signals which are induced on neighboring wires can severely disrupt communications which are being attempted on the impacted wires. In addition, if the proximate wires are not being used at the particular time, the systems connected to those wires may erroneously conclude that data communications are being attempted from a device connected to the wires. If these induced signals are not eliminated or disregarded, they can result in systems assuming that a data communication link has occurred on the unused wire. This condition is referred to as phantom link and can result in serious disruption to the management of the data communication network.

SUMMARY OF THE INVENTION

The present invention provides a method and a system for preventing phantom data communication links from occurring that substantially eliminates or reduces at least some of the disadvantages and problems associated with previous data communication network management techniques.

In accordance with a particular embodiment of the present invention a method for managing data communications is provided that comprises the step of providing a central office data communication switch that comprises a plurality of data communication ports. The central office data communication switch periodically transmits an inquiry on communication lines connected to each of the ports in order to discern whether or not a network device is connected to the data communication lines and desires to create a data communication link. A port controller within the central office data communication switch controls the transmission of the inquiry signal from each of the ports such that ports that are susceptible to crosstalk do not transmit the inquiry signal simultaneously. In this manner, the possibility that two network devices could respond to the same inquiry signal because of crosstalk is substantially eliminated.

According to another embodiment of the present invention, the data communication system builds and manages a database of ports that are susceptible to crosstalk with one another. If two ports are determined to be susceptible to crosstalk with one another, the database is used to prevent the simultaneous transmission of an inquiry signal on the two ports. If it is determined by the system that two ports are not susceptible to crosstalk with one another, then inquiry signals may be transmitted simultaneously on the two ports without danger of the formation of phantom links.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

Figure 1:
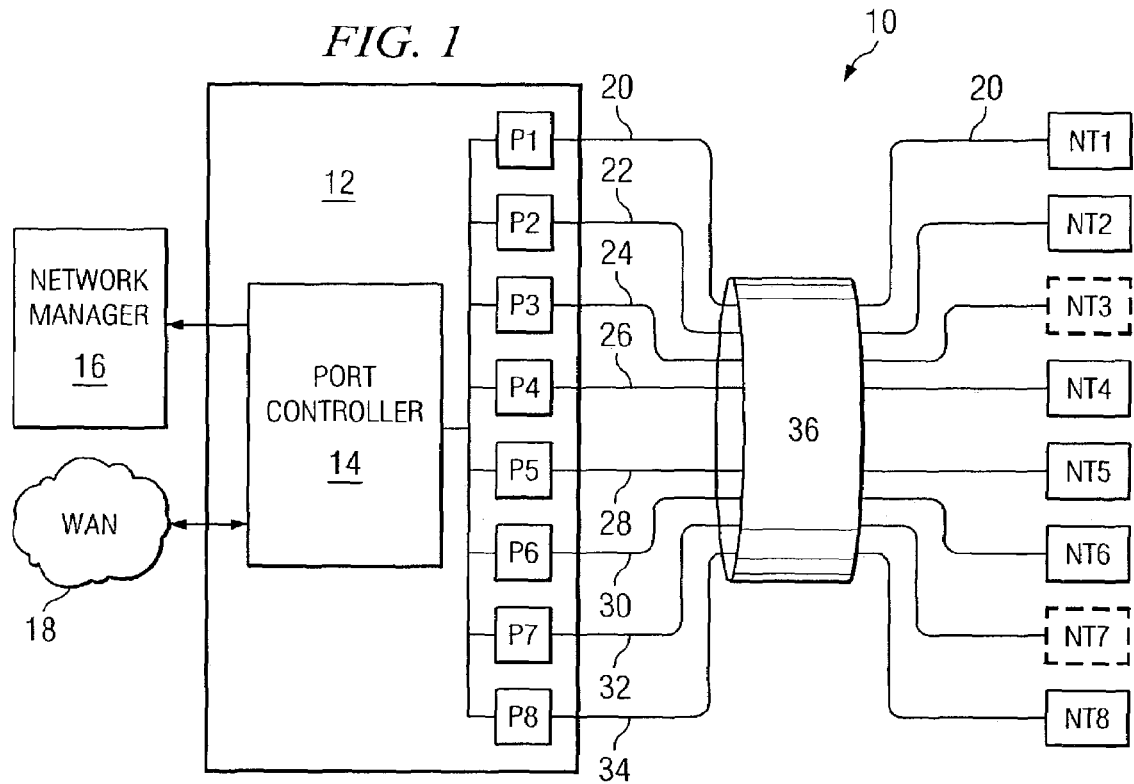
FIG. 1 is a schematic block diagram of one embodiment a data communication system constructed according to the teachings of the present invention.

Referring to FIG. 1, the data communication system indicated generally at 10 comprises a head-end switching system 12 which comprises a plurality of ports P1 through P8. Although the switching system 12 will be described with reference to eight ports it should be understood that any number of ports can be serviced using the system architecture of the present invention. System 12 also comprises a port controller system 14 which communicates and controls the communication and signaling occurring on each of the ports P1 through P8. The port controller 14 communicates with a network manager system 16. Network manager system 16 monitors and controls the flow of data packets through the switching system 12 and the ports P1 through P8. These data packets flow from the switching system 12 to and from a wide area network 18. Wide area network 18 may comprise, for example, a corporate virtual private network or a public network such as the internet.

The ports P1 through P8 are able to be connected to and communicate data with various network termination points such as NT1 through NT8 shown in FIG. 1. According to one embodiment of the present invention, the data communication protocol used to communicate data between the ports P1 through P8 and the network termination NT1 through NT8 may comprise a DSL or VDSL communication protocol and the physical media connecting the ports and the network termination points is twisted pair telecommunications media. For example, port P1 may be connected to network termination point NT1 by twisted pair line 20 shown in FIG. 1. A similar communication line 22 is connected to port P2. Similarly, lines 24, 26, 28, 30, 32 and 34 are connected to ports P3 through P8, respectively.

Communication lines 20 through 34 may, in certain implementations, be routed in close proximity to one another and may even be contained within a single communication line binder such as binder 36 shown in FIG. 1. This close proximity to one another can create issues of crosstalk of signals between adjacent lines. The placement of the lines within the binder 36 and the proximity of one line to another is very difficult to control. As such, it is difficult if not impossible to discern before the installation which lines will be susceptible to crosstalk with which other lines.

Crosstalk interference becomes an increasingly difficult problem as the frequencies used to communicate between the ports P1 through P8 and the network terminations NT1 through NT8 are increased. For example, in VDSL installations frequencies on the order of 1 MHz to 12 MHz can be used. In these installations, a communication line which is not connected to a network termination device can still carry an induced signal because of crosstalk which is strong enough to be sensed by one of the ports P1 through P8. In this situation, the port controller 14 can erroneously conclude that a network termination device is connected to the unused line and may inform the network manager 16 that a link has occurred between the port and on the unused line. This condition is commonly referred to as "phantom link". Because of the weakness of the crosstalk signal and because of other checks and balances within the network manager system 16, the phantom link will typically only survive intermittently. As such, the link condition for the phantom link will tend to "flap" meaning that it will obtain link status and then lose link status periodically over time. This can waste valuable resources within the port controller 14 and the network manager 16 which has to respond to the link status and verify whether or not a link has in fact occurred. These wasted resources have the effect of slowing the entire system incrementally due to the presence of these phantom links.

Referring to FIG. 1, an installation is shown where two of the ports namely P3 and P7 are not in use at the moment. As such, line 24 connected to P3 and line 32 connected to P7 are not connected to a network termination. In conventional DSL and VDSL installations, a port controller connected to ports within a head-end switch will constantly send out inquiry signals to attempt to determine if a network device has been connected to the network termination connected to the line connected to each port. In conventional installations these inquiry signals can be issued simultaneously on all ports. This can create significant phantom link problems. For example, if an inquiry signal were sent out from ports P2 and P3 simultaneously and lines 22 and 24 were susceptible to crosstalk interference, the inquiry signal would be received by network termination device NT2. This device could then answer on line 22 in an attempt to establish a link with head-end switch 12 through port P2. This answering signal could result in an induced signal on line 24 which would be received by port P3. In this case, both ports P2 and P3 would substantially simultaneously receive an answer signal attempting to establish a link. One of the answer signals would be the actual signal from device NT2 and the other answer signal would be the induced crosstalk signal on line 24. Port P3 as controlled by port controller 14 would erroneously assume that there was a device NT3 connected to line 24 that issued the answering signal. In this condition, port P3 and port controller 14 might try to establish a link with the phantom device NT3. In certain conditions, the port controller 14 could even report the attempted or established link through port P3 to the network manager 16. Thus a phantom link between port P3 and phantom device NT3 could be established. This detrimental condition results from the susceptibility of lines 22 and 24 to crosstalk and the simultaneous issuance of the inquiry signal from ports P2 and P3.

Figure 2A:
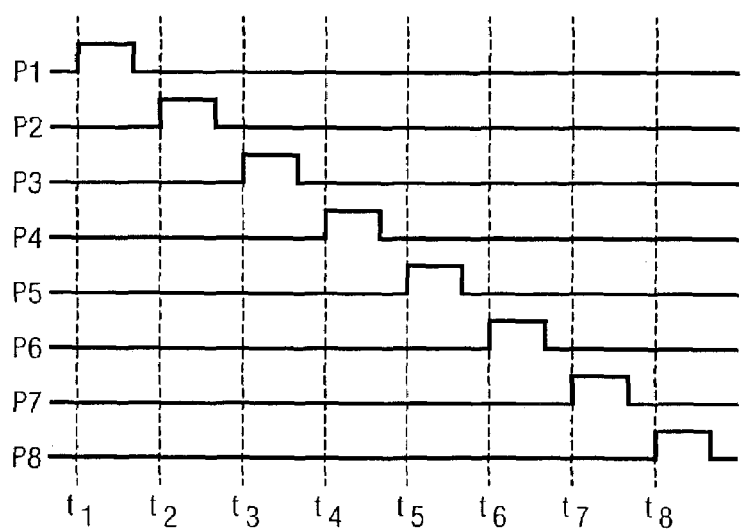
FIGS. 2A and 2B are timing diagrams which illustrate the timing of the inquiry signals from various ports within one embodiment of a data communications system of the present invention.
Figure 2B:
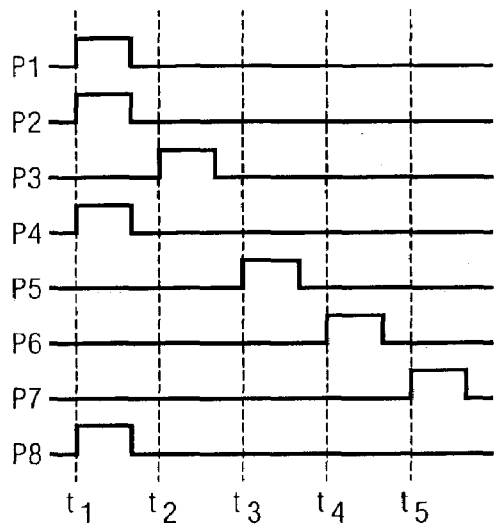

FIGS. 2A and 2B comprise signal timing diagrams that illustrate the operation of the system and method of one embodiment of the present invention to alleviate the phantom link problem. Referring to FIG. 2A, the inquiry signals transmitted from ports P1 through P8 are shown. For example, port P1 is idle until time T1 where it issues an inquiry signal line 20 and during a period time prior to time T2 port P1 and port controller 14 listen for a response from network device NT1. As shown in FIG. 2A, each of the ports P1 through P8 are reserved an individual time to issue their inquiry signal and to attempt to create a link with a network device. As shown, ports P2 through P8 issue their inquiry signals at times T3 through T8, respectively. It should be understood that the inquiries signals shown in FIG. 2A assume that no links have been established with any network devices. For example, if a particular port already had a link established the network manager 16 and port controller 14 would not instruct that particular port to issue an inquiry signal.

Also, as will be discussed herein, the signal tracings in FIG. 2A are the most conservative approach that could be taken in light of potential crosstalk difficulties. Because each port is reserved its own time to issue an inquiry signal there is no way that a port could respond to a crosstalk signal without detection by the port controller 14. For example, if port P2 were to issue the inquiry signal at time T2 and lines 22 and 24 were susceptible to crosstalk as discussed previously with reference to FIG. 1, port P3 may receive a response signal on line 24 that was actually issued by network device NT2. Because port P3 had not issued an inquiry signal at time T2, the port controller could easily determine that the response signal received at port P3 is a phantom signal created by crosstalk interference. In this circumstance, the port controller 14 would not attempt to establish a link through port P3 and so no wasted network resources would result. It is also possible for an inquiry signal to cause a short-term phantom link that is quickly corrected. For example, referring to FIG. 1, if lines 32 and 34 are substantially coupled through crosstalk and an inquiry signal is sent on port P7 prior to port P8 as shown in the sequence of inquiry signals of FIG. 2A then a phantom link may be established between port P7 and network device NT8. This link may appear and be maintained as normal until an inquiry signal is sent by port P8, at which point the link established on port P7 will drop indicating that the apparent link on that port was phantom.

In addition, according to another aspect of this embodiment of the present invention, continuing with the prior examples, the port controller 14 can log the occurrence of the phantom response on port P3 as a determination that lines 22 and 24 are susceptible to crosstalk interference. The port controller can also log the occurrence of the phantom response from port P7 after the inquiry and response through port P8 indicating that lines 32 and 34 are susceptible to crosstalk interference. In this manner, the port controller 14 can build a record of which lines are susceptible to crosstalk interference by creating a line database of interfering pairs whenever the power received from a phantom transmission exceeds a particular threshold power level. This interfering line database can be used by the port controller 14 to compress the inquiry signal transmission time and speed the inquiry process of the entire system 12. The operation of this inquiry signal compression is shown in detail in FIG. 2B. As discussed with reference to the previous example, ports P2 and P3 and ports P7 and P8 have been determined to have a danger of crosstalk interference with one other. As such, the inquiry signal from port P2 and the inquiry signal from port P3 should not be issued simultaneously. Accordingly, port P2 issues its inquiry signal as shown in FIG. 2B at time T1 and port P3 issues its inquiry at time T2. Similarly, port P8 issues its inquiry signal at time T1 and port P7 issues its inquiry signal at time T5. On the other hand, if it is determined definitively that two lines do not experience crosstalk interference with one another or if any crosstalk interference they experience is beneath acceptable threshold power levels, the inquiry signals on these line can be issued simultaneously. Referring to FIG. 2B, for example, the inquiries signals from port P1, P2, P4 and P8 can all be issued at time T1. In addition, if it has not yet been determined whether or not a line exhibits crosstalk interference with other lines, the inquiry signals from the ports associated with these lines are consequently issued independently. For example, referring to FIG. 2B again, ports P5 and P6 have not been assessed as to the danger of crosstalk interference with the other lines. As such, port P5 issues its inquiry signal time T3 and port P6 issues its inquiry at time T4 independent of other inquiry signals.

According to still another embodiment of the present invention, multiple groups of ports could issue inquiry signals simultaneously. For example, if it was established that port P3 had crosstalk signal difficulties with port P2 but did not have crosstalk signals with port P6, both port P3 and port P6 could issue inquiry signals at time T2. In this manner, the port controller 14 may be able to compress the inquiry signal process into a shorter time period to speed the creation of links and the response to the connection of new terminal devices to unconnected lines.

As discussed previously, the interfering line database within port controller 14 can be created over time by sensing the power of the phantom signals received by other ports after the issuance of an inquiry signal on a selected port. Another method determining crosstalk interference levels and for populated the interfering line database is disclosed in the patent application entitled Method and System For Measuring Cross-Talk Utilizing A Cross-Bar Switch assigned to the Assignee of the present application filed May 3, 2002, and currently pending in the United States Patent and Trademark Office under Ser. No. 10/138,468, the disclosure of which is hereby incorporated by reference.

Figure 3:
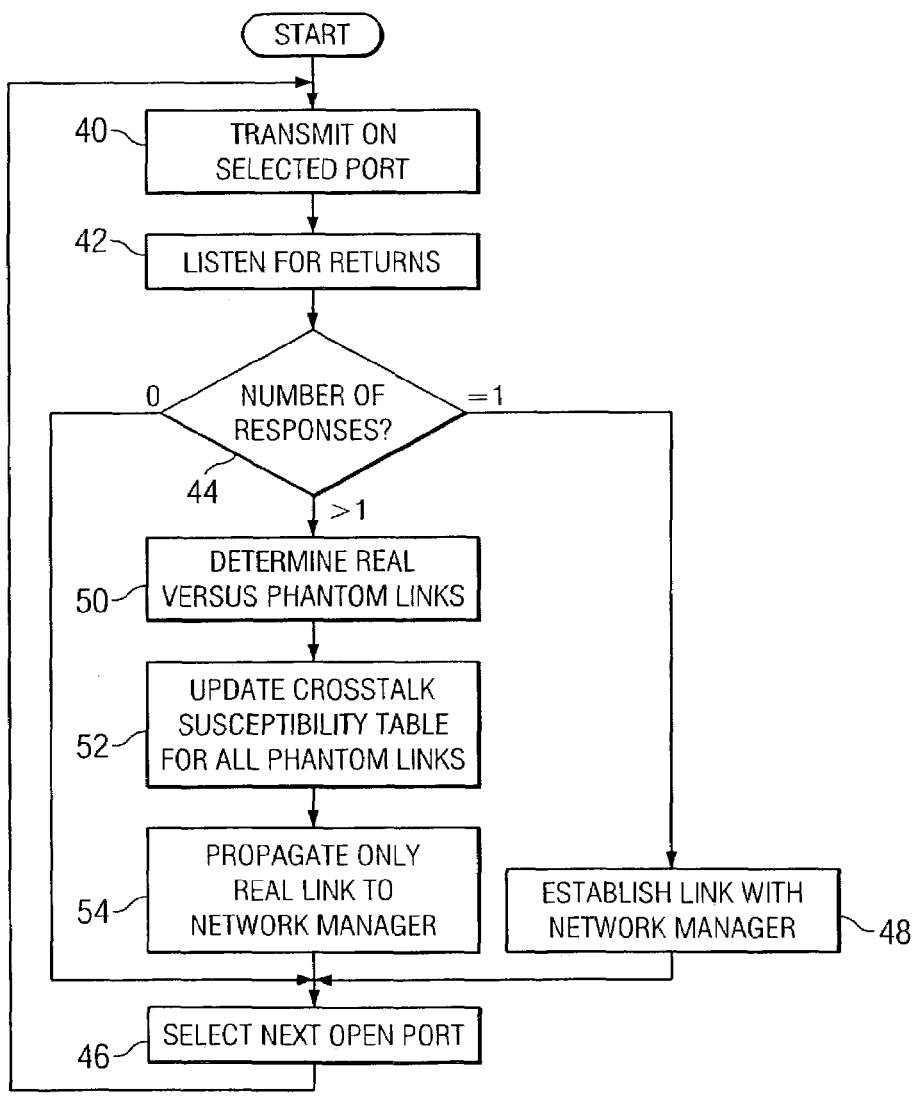
FIG. 3 is a flow chart that illustrates one embodiment of a method of operation of a data communications system according to the teachings of the present invention.

FIG. 3 is a flow chart which illustrates one embodiment of a method which may be used with the architecture of the present invention. Referring to FIG. 3, the method displayed begins at step 40 where the port controller 14 transmits an inquiry signal on a selected port. The method then proceeds to step 42 where the selected port and the port controller 14 listen for a responsive signal from a network device connected to the network termination associated with the selected port. The method then proceeds to step 44 where a determination is made as to whether of not more than one network devices responded to the inquiry issued in step 40. If at step 44 no network devices responded, the method proceeds to step 46 where the next open port that is not currently engaged in a communication link is selected. The method then returns to step 40. If exactly one port responded at step 44, the port controller 14 will proceed to establish the link with the network device and will inform the network manager of the existence of the link at step 48 shown in FIG. 3. The method then proceeds to step 46 when the next open port is selected.

If at step 44, the number of responses was greater than one, the method proceeds to step 50 where the real links and phantom links are identified. The method then proceeds to step 52 where the crosstalk link table is updated to include an identification of the pairs of physical connections which are susceptible to crosstalk interference. The method then proceeds to step 54 where the actual link determined in step 50 is established by the port controller 14 and propagated to the network manager 16. The method then proceeds to step 46 where the next open port is selected. From step 46, the method always returns to step 40 to transmit an additional inquiry signal on an open port. As shown in FIG. 3, the system 10 of the present invention is always inquiring as to the possibility of new links with new network devices and as such, the method shown in FIG. 3 does not end but continually loops back to test another open port.

Accordingly, a system and a method for data communication management is provided that allows for the sequential search and inquiry for new data communication links. The sequential processing of open links prevents the formation of phantom links which can detrimentally affect the operation of the overall system and the network management systems associated with the data communication system. This system can gradually compress the inquiry process by using and building a table of identifying pairs or groups of communication links which are susceptible to crosstalk interference with each other. In this manner, links which are not susceptible to crosstalk can be processed together and links which are susceptible to crosstalk will be processed in sequence.

Although the present invention has been described in detail it should be understood that various changes, modifications, alterations and substitutions may be made to the teachings described herein without departing from the scope and spirit of the present invention which is solely defined by appended claims.

What is claimed is:

1. A method for managing data communications, comprising:
   providing a head-end data communications switch comprising a plurality of ports, each of the plurality of ports operable to be coupled through one of a plurality of respective separate communication lines to a network device, the plurality of ports under the control of a port controller system;
   issuing an inquiry signal from a selected number of the plurality of ports wherein the selected number is less than the total number of the plurality of ports;
   listening for a phantom signal response to the inquiry signal on at least one port other than the selected number of the plurality of ports; and
   identifying cross talk interference between the at least one port other than the selected number of the plurality of ports and one of the selected number of the plurality of ports by receiving the phantom signal response on the at least one port other than the selected number of the plurality of ports.

2. The method of claim 1 wherein the selected number of the plurality of ports is a single port, further comprising:
   sequentially issuing an inquiry signal from each of the plurality of ports that is not engaged in a validated communication link with a network device.

3. The method of claim 1 wherein the selected number of the plurality of ports is more than one but less than the total of the plurality of ports, further comprising:
   selecting ports to simultaneously issue an inquiry signal by determining that the selected ports do not have substantial crosstalk interference with each other.

4. The method of claim 3 wherein the determination that the selected ports do not have substantial crosstalk interference with each other is associated with previous identification of cross talk interference between the ports, the previous identification recorded in a database accessed by the port controller system.

5. The method of claim 3 wherein ports for which crosstalk interference with other ports has not yet been determined sufficiently are processed individually until such crosstalk interference, if any, can be determined.

6. The method of claim 1, further comprising:
receiving a valid response signal from a connected network device in response to the inquiry signal; and
receiving a phantom response signal caused by a signal induced on a communication line by electromagnetic crosstalk from the valid response signal.

7. The method of claim 6, further comprising:
informing a network manager system associated with a switch of validated communication links.

8. The method of claim 6, further comprising:
entering into a line database accessible by the port controller the identity of the pair of communication lines on which the valid and phantom response signals were received.

9. A system for data communication, comprising:
a head-end switching system comprising a plurality of ports, each of the plurality of ports operable to be coupled through one of a plurality of respective separate communication lines to a network device;
a port controller system coupled to and controlling the plurality of ports and operable to:
cause a selected number of the plurality of ports to issue an inquiry signal,
listen for a phantom signal response to the inquiry signal on at least one port other than the selected number of the plurality of ports, and
identify cross talk interference between the at least one port other than the selected number of the plurality of ports and one of the selected number of the plurality of ports by receiving the phantom signal response on the at least one port other than the selected number of the plurality of ports.

10. The system of claim 9 wherein:
the selected number of the plurality of ports is a single port, and
the port controller system in causing a selected number of the plurality of ports to issue an inquiry signal is further operable to sequentially issue an inquiry signal from each of the plurality of ports that is not engaged in a validated communication link with a network device.

11. The system of claim 9 wherein:
the selected number of the plurality of ports is more than one but less than the total of the plurality of ports, and
the port controller system is further operable to select ports to simultaneously issue an inquiry signal by determining that the selected ports do not have substantial crosstalk interference with each other.

12. The system of claim 11 wherein the determination that the selected ports do not have substantial crosstalk interference with each other is associated with previous identification of cross talk interference between the ports, the previous identification recorded in a database accessed by the port controller system.

13. The system of claim 11 wherein ports for which crosstalk interference with other ports has not yet been determined sufficiently are processed individually until such crosstalk interference, if any, can be determined.

14. The system of claim 9 wherein the port controller system is further operable to:
receive a valid response signal from a connected network device in response to the inquiry signal; and
receive a phantom response signal caused by a signal induced on a communication line by electromagnetic crosstalk from the valid response signal.

15. The system of claim 14 wherein the port controller system is further operable to inform a network manager system associated with a switch of validated communication links.

16. The system of claim 14 wherein the port controller system is further operable to enter into a line database accessible by the port controller the identity of the pair of lines on which the valid and phantom response signals were received.

17. A system for managing data communications, comprising:
means for providing a head-end data communications switch comprising a plurality of ports, each of the plurality of ports operable to be coupled through one of a plurality of respective separate communication lines to a network device, the plurality of ports under the control of a port controller system;
means for issuing an inquiry signal from a selected number of the plurality of ports wherein the selected number is less than the total number of the plurality of ports;
means for listening for a phantom signal response to the inquiry signal on at least one port other than the selected number of the plurality of ports; and
means for identifying cross talk interference between the at least one port other than the selected number of the plurality of ports and one of the selected number of the plurality of ports by receiving the phantom signal response on the at least one port other than the selected number of the plurality of ports.

18. The system of claim 17 wherein the selected number of the plurality of ports is more than one but less than the total of the plurality of ports, further comprising:
means for selecting ports to simultaneously issue an inquiry signal by determining that the selected ports do not have substantial crosstalk interference with each other.

19. The system of claim 18 wherein the determination that the selected ports do not have substantial crosstalk interference with each other is associated with previous identification of cross talk interference between the ports, the previous identification recorded in a database accessed by the port controller system.

20. The system of claim 18 wherein ports for which crosstalk interference with other ports has not yet been determined sufficiently are processed individually until such crosstalk interference, if any, can be determined.

21. The system of claim 17, further comprising:
means for receiving a valid response signal from a connected network device in response to the inquiry signal; and
means for receiving a phantom response signal caused by a signal induced on a communication line by electromagnetic crosstalk from the valid response signal.

22. The system of claim 21, further comprising:
means for informing a network manager system associated with a switch of validated communication links.

23. The system of claim 21, further comprising:
means for entering into a line database accessible by the port controller the identity of the pair of communication lines on which the valid and phantom response signals were received.

* * * * *